(12) United States Patent
Basso

(10) Patent No.: US 6,345,078 B1
(45) Date of Patent: *Feb. 5, 2002

(54) FINGER ASSIGNMENT SYSTEM FOR A MULTIPLE FINGER RECEIVER AND METHOD THEREOF

(75) Inventor: James Basso, Englishtown, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,626

(22) Filed: Jul. 31, 1997

(51) Int. Cl.$^7$ ................................................. H04B 1/10
(52) U.S. Cl. ....................................... 375/349; 375/347
(58) Field of Search ................................ 375/316, 347, 375/349, 348, 267, 346, 285; 455/500, 504, 506, 132, 137, 135; 370/320, 375, 342, 441

(56) References Cited

U.S. PATENT DOCUMENTS

| | | | |
|---|---|---|---|
| 5,233,626 A | | 8/1993 | Ames |
| 5,490,165 A | | 2/1996 | Blakeney et al. |
| 5,548,613 A | * | 8/1996 | Kaku et al. ................. 375/208 |
| 5,619,524 A | * | 4/1997 | Ling et al. .................. 375/200 |
| 5,671,221 A | * | 9/1997 | Yang .......................... 370/320 |
| 5,691,974 A | * | 11/1997 | Zehavi et al. ............... 370/203 |
| 5,818,887 A | * | 10/1998 | Sexton et al. ............... 375/355 |
| 5,828,659 A | * | 10/1998 | Teder et al. ................. 370/328 |
| 5,867,527 A | * | 2/1999 | Ziv et al. .................... 375/208 |
| 5,887,021 A | * | 3/1999 | Keskitalo et al. ........... 375/200 |
| 5,889,815 A | * | 3/1999 | Iwakiri ....................... 375/205 |
| 5,920,284 A | * | 7/1999 | Victor ..................... 342/357.01 |
| 5,945,948 A | * | 8/1999 | Buford et al. .............. 342/457 |
| 6,005,605 A | * | 12/1999 | Kostreski et al. ............. 348/21 |
| 6,009,089 A | * | 12/1999 | Huang et al. ............... 370/342 |
| 6,047,017 A | * | 4/2000 | Cahn et al. ................. 375/200 |
| 6,128,333 A | * | 10/2000 | Kinoshita et al. ........... 375/147 |
| 6,173,014 B1 | * | 1/2001 | Forssen et al. ............. 375/267 |

FOREIGN PATENT DOCUMENTS

JP          07335209          12/1995

* cited by examiner

*Primary Examiner*—Chi Pham
*Assistant Examiner*—Emmanuel Bayard

(57) ABSTRACT

A finger assignment system prevents the assignment of receiver fingers to the same multipath component and to avoid the inefficiencies associated with current schemes. The finger assignment system accomplishes this by setting an offset or delay difference between the offsets or delays assigned to any two fingers, and if the offset or delay difference is violated, adjusting the offset(s) or delay(s) of one or both of the fingers to differ from each other by at least the offset difference. In certain embodiments, the receiver establishes an offset or delay difference between the offsets or delays assigned to any two fingers which are receiving signals from the same antenna. If the offset difference is violated, the finger assignment system adjusts the assigned offset or delay of the weaker finger to differ from the assigned offset of the stronger finger by at least the offset difference. Thus, the receiver scheme according to the principles of the present invention tends to have more receiver fingers tracking more multipath components a higher percentage of the time. The more effective use of the receiver fingers according to the principles of the present invention tends to increase the multipath diversity of the receiver and to improve the average SNR of the receiver.

14 Claims, 5 Drawing Sheets

FINGER ASSIGNMENT SYSTEM FOR A MULTIPLE FINGER RECEIVER AND METHOD THEREOF

BACKGROUND OF THE INVENTION

1. Field of the Invention

The present invention relates to mobile communication systems in general and, more particularly, to a scheme for assigning receiver fingers of a multiple finger receiver to different offsets corresponding to multipath components.

2. Description of the Related Art

A mobile communications channel can rarely by modeled as purely line-of-site. Therefore, one must consider the many independent paths that are the result of scattering and reflection of a signal between the many objects that lie between and around the mobile station and the base station. The scattering and reflection of the signal creates many different "copies" of the transmitted signal ("multipath signals") arriving at the receiving station with various amounts of delay, phase shift and attenuation. As a result, the signal received at the mobile station from the base station (and at the base station from the mobile station) is made up of the sum of many signals, each traveling over a separate path. Since these path lengths are not equal, the information carried over the radio link will experience a spread in delay as it travels between the base station and the mobile station. The amount of time dispersion between the earliest received copy of the transmitted signal and the latest arriving copy having a signal strength above a certain level is often referred to as delay spread. Delay spread can cause intersymbol interference (ISI). In addition to delay spread, the same multipath environment causes severe local variations in the received signal strength as the multipath signals are added constructively and destructively at the receiving antenna. A multipath component is the combination of multipath signals arriving at the receiver at nearly the same delay. These variations in the amplitude of the multipath components is generally referred to as Rayleigh fading, which can cause large blocks of information to be lost.

Resistance to multipath fading is a reason for using spread spectrum systems for wireless communications. Spread spectrum signals are pseudorandom and have noise-like properties when compared with the digital information data. Certain spread spectrum systems, such as code-division multiple access (CDMA) systems, spread the baseband data by directly multiplying the baseband data pulses with a pseudo-noise (PN) code, which is a binary sequence that appears random but can be reproduced by the intended receiving station. The PN code has a much higher pulse rate than the data pulse rate, and a single pulse of the PN code is called a chip. Spread spectrum signals are demodulated in part at the receiving station through cross-correlation with a locally-generated version of the PN code. Cross-correlation with the correct PN code de-spreads the spread spectrum signal and restores the modulated message to the narrower band of the original data, while cross-correlating the signal from an undesired user with the PN code results in a small amount of noise. Because spread spectrum signals are spread over a large bandwidth, only a small portion of the spectrum experiences fading at any given time. The resistance of spread spectrum systems to multipath fading can also be explained from the fact that delayed versions of the transmitted signal should be generally uncorrelated with the original PN code and will simply appear as noise from another uncorrelated user.

Spread spectrum systems, such as CDMA systems, however, can advantageously use the delayed versions of the transmitted signal. Spread spectrum systems exploit the multipath environment by combining the information obtained from several resolvable multipath components. In CDMA systems, the effects of multipath are combated and advantageously exploited by using a multiple-branch (RAKE) receiver. FIG. 1 shows a RAKE receiver 10 with four "fingers" 12a–d. The RAKE receiver 10 can be implemented using a CDMA Cell Site Modem ASIC provided by Qualcomm of San Diego, Calif. as well as the control thereof. The RAKE receiver 10 attempts to collect the delayed or offset versions of the original signal by providing parallel demodulators or fingers 12a–d. Each demodulator 12a–d uses a different amount of delay or offset corresponding to a multipath component of the signal from a particular antenna 14. Initially, processing circuitry 18 assigns a delay or offset corresponding to a multipath component to each demodulator 12a–d. Afterward, tracking loops 20a–d make adjustments to the assigned delay or offset for the demodulators 12a–d. In a current CDMA RAKE receiver, finger tracking loops 20a–d perform ⅛ PN chip adjustments to the assigned offsets or delays of the demodulators 12a–d. Searcher circuitry 19 performs a search to find the strongest multipath components within a range of offsets or delays. The results from the searcher 19 are used for the initial finger assignments and/or for any finger re-assignments after a finger 12a–d is disabled. A combiner 22 combines the outputs from the demodulators 12a–d and outputs the combined signal to the remainder of the receiver 10. The receiver 10 includes other aspects which are not discussed. For example, the combined signal is subsequently decoded. Furthermore, the signal received at the antenna 14 which is demodulated as generally described above can undergo additional processing depending on the particular implementation. For example, base stations typically use non-coherent demodulation, and mobile stations typically use coherent demodulation.

Each demodulator 12a–d de-spreads the incoming signal using the PN code and the delay or offset assigned to the demodulator 1212a–d . As such, the demodulators 12a–d extract multipath components of the original signal. The use of the parallel demodulators 12a–d improves the signal-to-noise ratio (SNR) of the received signal for the given user and provides a statistical and power diversity gain because uncorrelated multipath components will fade independently. Ideally, multipath components are uncorrelated when the components are more than 1 PN chip (approximately 0.8138 microseconds in IS-95 CDMA) from each other. The finger tracking loop 20a–d for each demodulator 12a–d of the RAKE receiver 10 is designed to keep the assigned finger delay or offset synchronized with the delay or offset yielding the strongest finger energy for the multipath component being tracked. Typically, an early-late gate tracking mechanism adjusts the assigned delay or offset based on the difference in finger energy between an early hypothesis (less delay) and a late hypothesis (more delay). As such, each tracking loop 20a–d adjusts the delay or offset for its finger 12a–d toward the local maximum of the correlation between the PN code and the received spread signal. A multipath component of a finger 12a–d having a particular offset will be partially correlated with a multipath component of another finger 12a–d having a difference in offset of less than 1 PN chip. Due to the partial correlation between the multipath components, the fingers 12a–d could end up tracking the same multipath component. Because of the early-late gate tracking mechanism, the tracker 20 could potentially be affected by multipath components having a difference in offset of more than 1 PN chip. For example, if the tracker uses +/−¼ chip early/late correlation hypothesis, the tracker 20a–d could be potentially influenced by a multipath component that is 1¼ chips away. Thus, even demodulators 12a–d assigned to offsets or delays greater than 1 PN chip in difference can still end up tracking the same multipath component.

For ease of explanation, FIGS. 2a–c represent the finger strength depending on the PN chip offset (delay) for several simplified situations involving two multipath components A and B. FIG. 2a shows the output 28 representing the correlation between PN de-spreading codes and the received signal for two, unfaded multipath components A and B separated by a differential delay d. FIG. 2b represents multipath component B experiencing a fade while multipath component A is unfaded, and FIG. 2c shows multipath component A experiencing a fade while multipath component B is unfaded. As such, when the multipath components A and B are uncorrelated (i.e., separated by greater than 1 PN chip offset) and if one finger 12 is tracking a faded multipath component, another finger 12 is probably tracking an unfaded multipath component, thereby preventing data from being lost. Consequently, the parallel demodulators 12a and 12b increase the multipath diversity gain and the average SNR for the receiver 10.

Multipath components having delays that are within or about 1 PN chip of each other (approximately 0.8138 microseconds in IS-95 CDMA) are common and can cause duplicate finger assignments, degrading SNR and the multipath diversity gain for the RAKE receiver 10. In fact, as mentioned above multipath components having delays greater than 1 PN chip can even lead to duplicate finger assignments. The RAKE receiver 10 may experience difficulty in consistently resolving more than one unique multipath component per antenna at any given instant in a low delay spread environment because of the behavior of current finger tracking loops 20a–d. For ease of explanation, FIGS. 3a–c show simplified representations of fingers 12a and 12b assigned to two different resolved multipath components. The difference d between the PN offsets of the fingers 12a and 12b is relatively small, for example less than 1 PN chip (low delay spread environment).

In FIG. 3a, the multipath components tracked by the fingers 12a and 12b are unfaded, and the tracking loops 20a and 20b maintain the assignment of the fingers 12a and 12b. In FIG. 3b, however, the multipath component of finger 12b is fading, and the nearby component of finger 12a is unfaded. In response, the tracking loop 20b of finger 12b tends to move the assigned PN offset corresponding to a multipath component for the finger 12b towards the offset of the stronger multipath component assigned to the finger 12a. Similarly, in FIG. 3c, the finger 12a is tracking a multipath component that goes into a fade, and the nearby multipath component assigned to the finger 12b is not in a fade. The tracker 20a adjusts the PN offset assigned to the finger 12a toward the PN offset of the stronger component assigned to the finger 12b. Therefore, in a low delay spread environment, current systems can experience duplicate finger assignments (two fingers with the same assigned delay corresponding to the same multipath component).

Duplicate finger assignments are undesirable because they provide no multipath diversity gain as with independently fading multipath components and thereby no improvement in the average SNR. Current systems combat duplicate finger assignments by simply disabling one of the duplicate fingers as a finger 12a–d appears within a certain amount of delay or offset from the delay or offset of the other finger 12a–d. The system searches for another unassigned multipath component which may be the previously faded multipath component which has re-emerged and reassigns the duplicate finger to that multipath component. This scheme of disabling, searching and reassigning reduces the efficiency and effectiveness of the receiver, especially in the case of a continuously fading and re-emerging multipath component.

Accordingly, a need exists for a multiple finger receiver that effectively assigns the receiver fingers to multipath components in a manner which reduces the adverse effects of duplicate finger assignments.

SUMMARY OF THE INVENTION

The present invention uses a finger assignment system to prevent the assignment of receiver fingers to the same multipath component and to avoid the inefficiencies associated with current schemes. The finger assignment system accomplishes this by setting an offset or delay difference between the offsets or delays assigned to any two fingers, and if the offset or delay difference is violated, adjusting the offset(s) or delay(s) of one or both of the fingers to differ from each other by at least the offset difference. In certain embodiments, the receiver establishes an offset or delay difference between the offsets or delays assigned to any two fingers which are receiving signals from the same antenna. If the offset difference is violated, the finger assignment system adjusts the assigned offset or delay of the weaker finger to differ from the assigned offset of the stronger finger by at least the offset difference. Thus, the receiver scheme according to the principles of the present invention tends to have more receiver fingers tracking more multipath components a higher percentage of the time. The more effective use of the receiver fingers according to the principles of the present invention tends to increase the multipath diversity of the receiver and to improve the average SNR of the receiver.

BRIEF DESCRIPTION OF THE DRAWING

Other aspects and advantages of the present invention may become apparent upon reading the following detailed description and upon reference to the drawings in which.

DETAILED DESCRIPTION

Illustrative embodiments of the finger assignment system for a multiple finger receiver according to the principles of the present invention are described below as the finger assignment system might be implemented to enhance performance for a multiple finger/parallel demodulator receiver.

The finger assignment system accomplishes this by preventing the assignment of receiver fingers to the same multipath component. In doing so for a particular antenna, the receiver maintains a difference between the delays or offsets assigned to any two receiver fingers. If a receiver finger 12a–d violates the offset difference, the finger assignment system according to the principles of the present invention maintains the assignment of the fingers 12a–d to their respective multipath components but adjusts the assigned offset or delay of the weaker finger 12a–d to differ from the offset or delay of the stronger finger 12a–d by the offset difference. Thus, the receiver scheme according to the principles of the present invention tends to have more receiver fingers tracking more total signal paths or multipath components a higher percentage of the time. The more effective use of the receiver fingers according to the principles of the present invention tends to increase the multipath diversity gain of the receiver and to improve the average SNR of the receiver. Increasing the average SNR at the receiver for a particular transmitter power level leads to higher system capacity.

Figure 1:
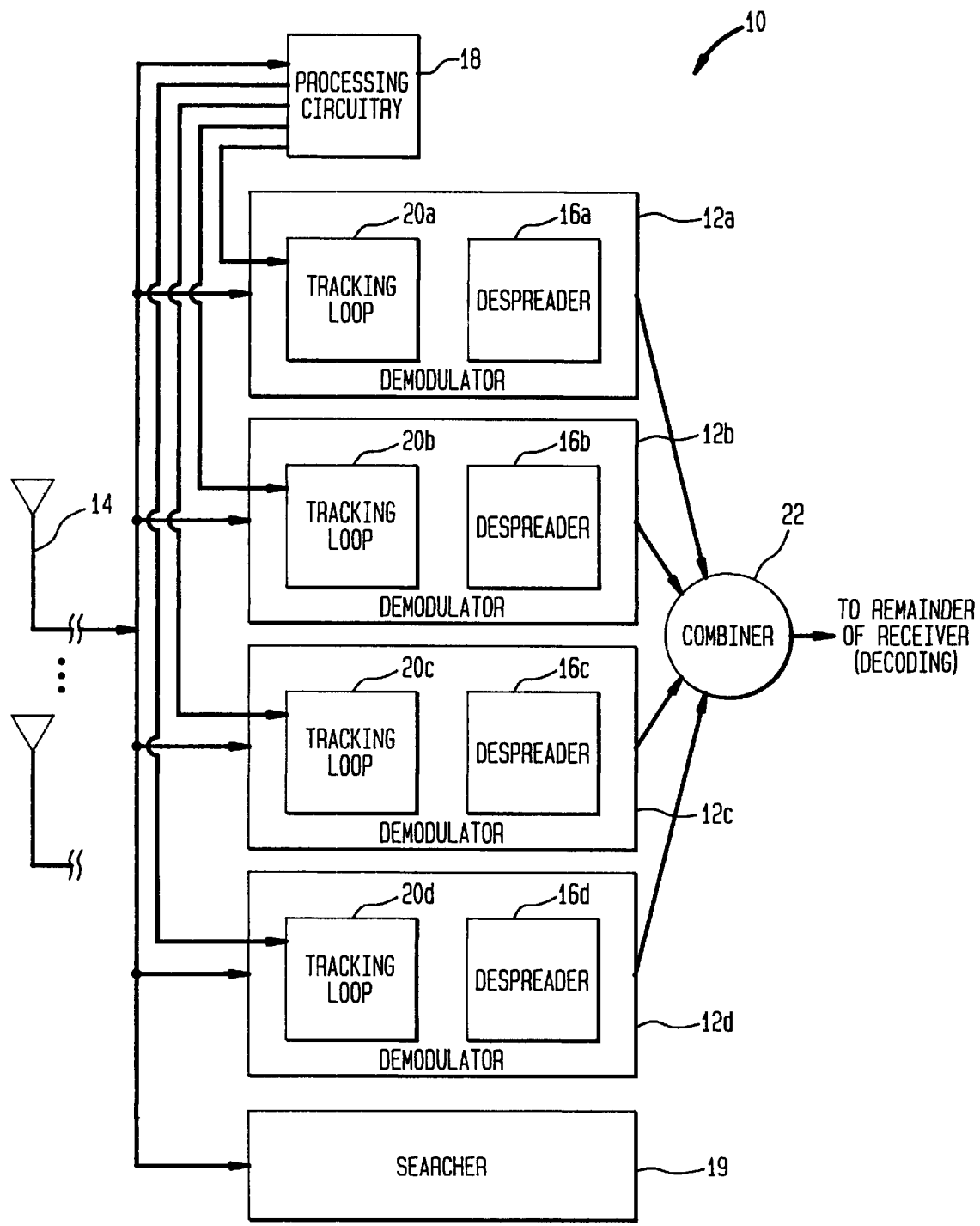
FIG. 1 shows a general block diagram of a four finger CDMA RAKE receiver which can utilize the finger assignment system according to the principles of the present invention.
Figure 2A:
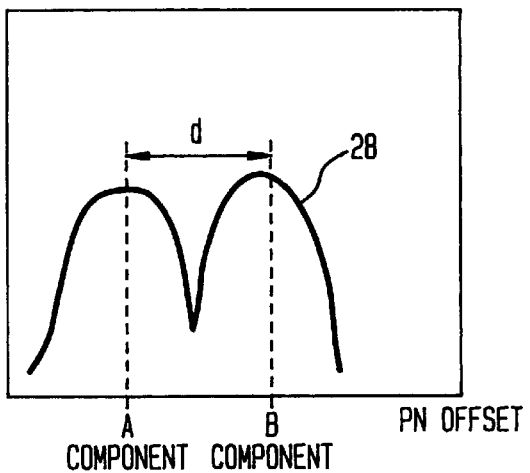
FIGS. 2a–c shows simplified plots for finger strength v. PN offset for several simple situations involving two multipath components.
Figure 2B:
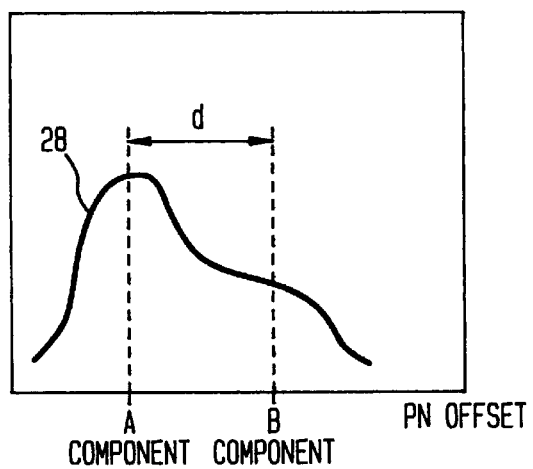
Figure 2C:
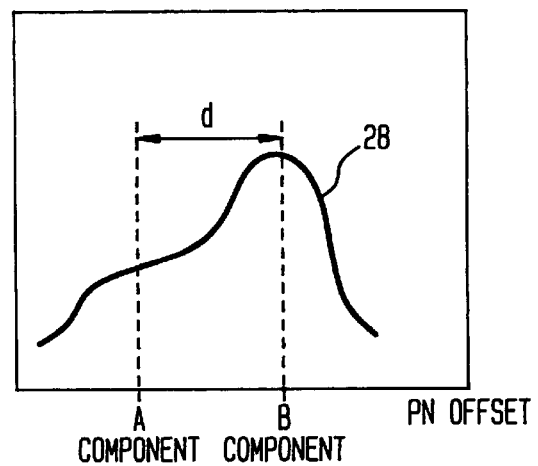
Figure 3A:
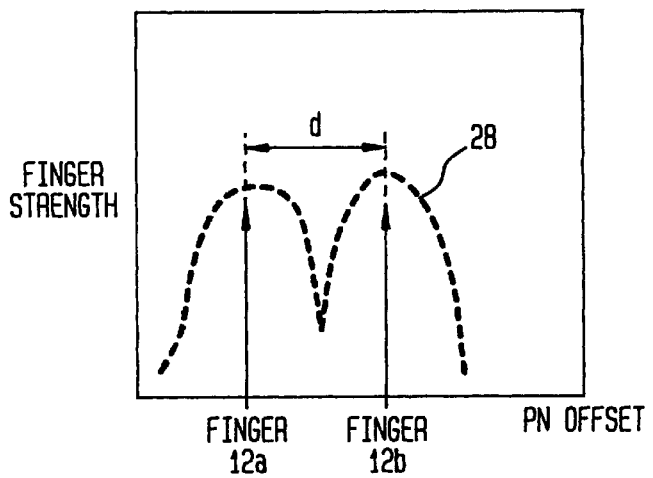
FIGS. 3a–c illustrate several simplified examples showing varying finger strength v. PN offset and how duplicate finger assignments can occur in a low delay spread multipath environment.
Figure 3B:
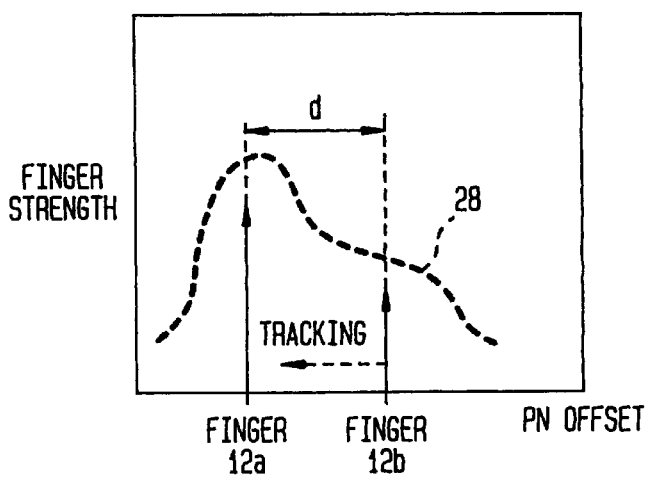
Figure 3C:
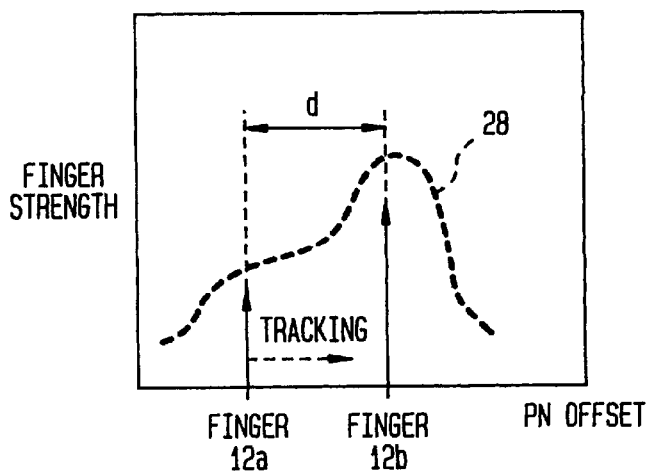

As described above, FIG. 1 shows a block diagram of a RAKE receiver 10 with four fingers or demodulators 12a–d. A finger assignment system according to the principles of the present invention can be utilized with the receiver 10 to prevent the assignment of the receiver fingers 12a–d to the same multipath component. In this particular embodiment, the receiver 10 keeps the demodulators 12a–d, which are beginning to track the same multipath component, assigned to their respective multipath components by maintaining an offset difference between the PN offsets assigned to any two receiver fingers receiving a signal from a given antenna. In a receiver with a plurality of antennas, fingers assigned to the same delay or offset but different antennas are also uncorrelated. In this description, the demodulators 12a–d will be described as connected to the single antenna 14 although the assignment of a finger 12a–d to a different antenna is possible depending on the application.

The finger assignment system can be implemented as part of the tracking loop circuitry 20a–d and/or the processing circuitry 18. Additionally, the finger assignment system or portions thereof can be implemented as hardware and/or software. For example, the finger assignment system or a portion thereof can be implemented and operated on a continuous or intermittent basis as hardware in the tracking loop 20a–d, or the finger assignment system or a portion thereof can be implemented and operated intermittently (for example, every 14 ms.) as software in the RAKE receiver processing circuitry 18.

Figure 4:
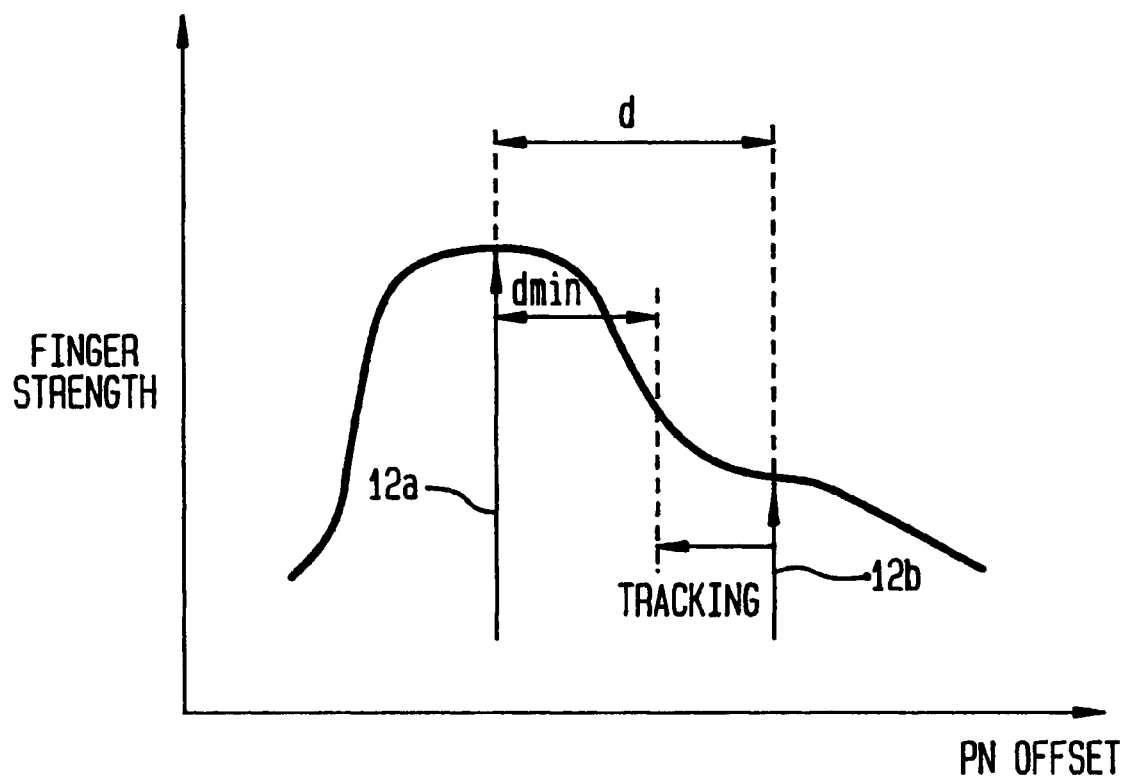
FIG. 4 illustrates a simplified example showing how an embodiment of the finger assignment system according to the principles of the present invention prevents duplicate finger assignment.

FIG. 4 illustrates how a particular embodiment of the finger assignment system responds to fading in a low delay spread, multipath environment. The finger 12a (FIG. 1) represented by arrow 12a is assigned to an offset corresponding to a first multipath component. The finger 12b (FIG. 1) represented by an arrow 12b is assigned to an offset corresponding to a second multipath component which is fading and separated from the first multipath component by a difference d. Initially, in this particular embodiment, the finger assignment system establishes a minimum PN offset difference $d_{min}$ between the offset delays of any two fingers 12 (FIG. 1) receiving input from the same antenna such that these two fingers 12a and b are only weakly correlated. The offset difference is chosen so that at worst the fingers 12a and 12b will be weakly correlated, for example by using an offset difference of ¾ PN chip. As such, the offsets assigned to the two fingers 12a and 12b should be separated by at least the offset difference $d_{min}$.

In this particular embodiment, the tracking loop 20b (FIG. 1) of the finger 12b adjusts the timing delay for the finger 12b towards the stronger multipath component of the finger 12a and violates the minimum difference $d_{min}$. Instead of simply disabling the duplicate finger 12b, searching for another multipath component and reassigning the finger 12b to the offset corresponding to another multipath component or to the same multipath component which has re-emerged from a fade, the finger assignment system according to the principles of the present invention adjusts the assigned PN offset of the weaker finger 12b to differ from the offset of the stronger finger 12a by at least the offset difference $d_{min}$. In this particular embodiment, the tracking loop 20b of the weaker finger 12b is constrained because the weaker finger 12b generally tends to track off of its assigned multipath component toward the nearby stronger multipath component.

Additionally, in this particular embodiment, the finger 12b that had its timing constrained/adjusted can still be disabled if it fails a signal detection quality metric, such as a metric based on the lock state of the finger 12b (which is determined by comparing the finger energy to a "lock" threshold) or on a series of observations of the lock state of the finger 12b. If the finger 12b is disabled for failing a signal quality metric, the finger 12b is disabled, and the finger 12b would be assigned an offset corresponding to a stronger unassigned multipath component. In such a case, however, the finger 12b is disabled due to poor signal reception not because of duplicate finger assignment. The tracking circuitry 20b is enabled if the energy of the finger 12b is above a certain threshold, and the offset or delay for the finger 12b is not updated if the finger energy is below the threshold. If the finger 12b was merely experiencing a brief fade, the finger 12b should have an acceptable signal detection quality metric, and the finger 12b will continue to be useful at the assigned offset. When the multipath component of the finger 12b comes out of the fade, the tracking circuitry 20b will resume tracking the multipath component. The tracking circuitry 20b will be allowed to continue tracking the multipath component provided the offset of the finger 12b does not move too close to the offset assigned to another finger 12a, 12c and 12d as controlled by the finger assignment system according to the principles of the present invention.

Figure 5:
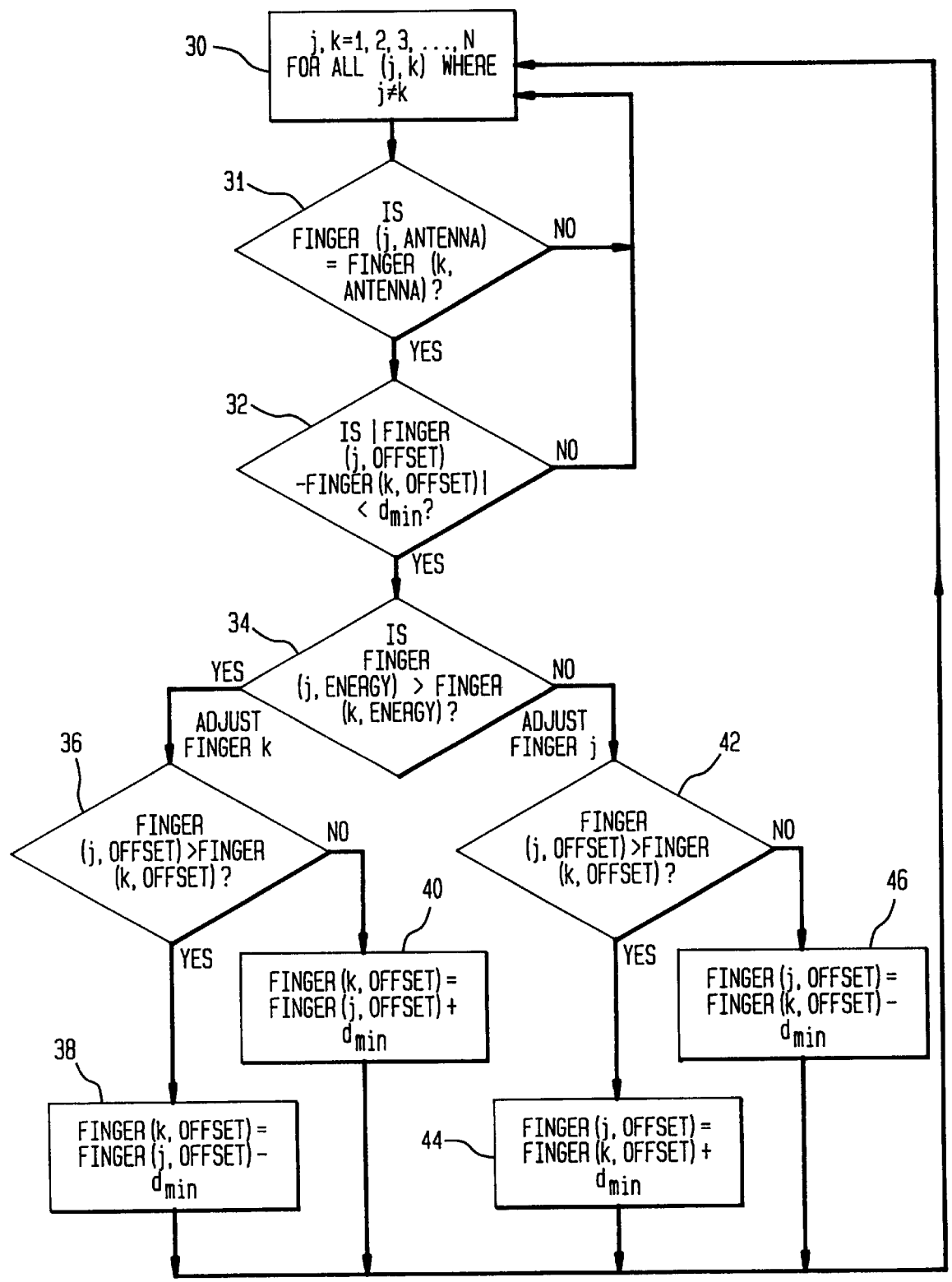
FIG. 5 shows a flow diagram for a particular embodiment of a finger assignment system according to the principles of the present invention.

FIG. 5 shows a flow diagram for a particular embodiment of the finger assignment system. Block 30 sets up a loop to produce all values of j and k, where j, k=1 . . . N and N is the number of fingers and j is not equal to k to enable comparisons between all of the fingers. Block 31 checks if the fingers j and k are assigned to the same antenna. If not, the system goes back to the block 30 for another pair of fingers. If so, at block 32, the finger assignment system compares the difference between the offsets assigned to fingers j and k with the minimum difference $d_{min}$ which in this particular embodiment is ¾ PN chip or about 0.61 microseconds. If the offset difference is greater than or equal to $d_{min}$, the assignment of offsets for the fingers j and k is acceptable, and the system returns to the block 30 for a comparison between another pair of fingers j and k. If the difference is less than $d_{min}$, the offset delays for the fingers j and k are too close together, and the system proceeds to block 34 to determine which of the fingers j or k has the instantaneously weaker signal component.

If the finger k has the weaker multipath component, the finger assignment system of this particular embodiment will adjust the offset for the finger k. To adjust the offset for the finger k in this particular embodiment, the system proceeds to block 36 and determines which finger j or k has the greater offset. If the offset of the finger j is greater than the offset for the finger k, the system adjusts the offset delay for the finger k at block 38 as the offset of the finger j minus $d_{min}$. If the offset for the finger k is greater than or equal to the offset for the finger j, the system sets the offset for the finger k at block 40 as the offset for the finger j plus $d_{min}$.

At block 34, if the finger j has the weaker multipath component, the finger assignment system of this particular embodiment will adjust the offset for the finger j. To set the offset for the finger j in this particular embodiment, the system proceeds to block 42 and determines which of the fingers j or k has the greater offset. If the offset for the finger j is greater than the offset for the finger k, the system sets the offset for the finger j at block 44 as the offset for the finger k plus $d_{min}$. If the offset for the finger k is greater than the offset for the finger j, the system sets the offset for the finger j at block 46 as the offset for the finger k minus $d_{min}$.

The adjusting of the offset assigned to a finger 12 by the finger assignment system can be implemented in different ways. For example, once the offset difference between fingers is violated, the processing circuitry 18 can make incremental adjustments of, for example, 1/8 PN chip at a time to the offset assigned to the finger 12 until the offset difference is reached. In a particular embodiment, the processing circuitry 18 is a general purpose microprocessor which runs software and implements a portion of the finger assignment system. The processing circuitry 18 provides signals to an Application Specific Integrated Circuit (for example, the Qualcomm CDMA Cell Site Modem ASIC) which implements the other portions of the RAKE receiver 10, and those signals adjust the offset for the finger by increments of 1/8 PN chips at a time. Alternatively, in other embodiments where the processing circuitry 18 is embedded deeper in the operation of the finger assignment system, the processing circuitry 18 could replace the offset assigned to the finger 12 with the adjusted offset. Additionally, in other embodiments, portions of the processing circuitry 18 described above can be implemented as hardware in the tracking circuitry 20*a–d* (FIG. 1) or in the demodulators 12*a–d* to constrain the finger assignment system with the condition that the offset difference and the current finger assignments be maintained (unless signal quality metrics are not met) rather than adjusting the offset difference.

As such, the finger assignment system according to the principles of the present invention prevents duplicate finger assignments and tends to have fingers locked on to more multipath components a higher percentage of the time. This will increase the multipath diversity gain of the multiple finger receiver and will improve the average SNR of the receiver. Alternative configurations of the finger assignment system according to the principles of the present invention are possible which add or omit steps and/or perform variations of the above-described system. Other alternative embodiments can be used which are encompassed by the principles of the present invention to provide a finger assignment system which adjusts the corresponding offsets or delays for the fingers to maintain an offset difference as a buffer between the offsets or delays assigned to the receiver fingers. Additionally, in certain embodiments, the offsets have been described in terms of PN chip offsets or delays, but the principles of the present invention encompass offsets or delays in terms of other parameters.

The finger assignment system has been described as being used in a four finger CDMA RAKE receiver, but the finger assignment system and portions thereof can be used with any multiple finger/demodulator receiver in which fingers are assigned to offsets or delays for receiving multiple multipath components. Additionally, the finger assignment system can be implemented in coherent or non-coherent receivers and in base stations or mobile stations. The finger assignment system according to the principles of the present invention can be implemented utilizing various embodiments of application specific integrated circuit(s), software driven processing circuitry, and/or various arrangements of discrete components. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. A method of receiving a communication signal from an antenna by using a receiver having a plurality of fingers which are initially assigned delays, called offsets corresponding to multipath components of said communication signal, said method comprising the steps of:

adjusting at least one of the offsets of said at least two of said plurality of fingers to maintain an offset difference between said offsets of said at least two of said plurality of fingers.

2. The method of claim 1 wherein said step of adjusting including the step of:

adjusting a first offset of a first receiver finger receiving a relatively weak component to differ from a second offset of a second receiver finger receiving a stronger component by at least said offset difference when said offset difference between said first and second offsets has been violated.

3. The method of claim 1 wherein said step of adjusting includes the step of using PN code offsets as said offsets.

4. The method of claim 1 further including the step of using a CDMA RAKE receiver as said receiver having a plurality of receiver fingers.

5. A method of controlling a receiver having a plurality of receiver fingers which are initially assigned delays, called offsets, corresponding to multipath components of a signal from an antenna, said method comprising the steps of:

establishing an offset difference; and adjusting a first offset of a first receiver finger receiving a relatively weak component to differ from a second offset of a second receiver finger receiving a stronger component by at least said offset difference when said offset difference between said first and second offsets has been violated.

6. The method of claim 5 further including the step of using PN code offsets as said offsets.

7. The method of claim 5 further including the step of using a CDMA RAKE receiver as said receiver having a plurality of receiver fingers.

8. A receiver comprising:

a plurality of receiver fingers initially assigned delays, called offsets, corresponding to multipath components of a signal from an antenna; and said receiver configured to adjust at least one of the offsets of at least two of said plurality of fingers for maintaining an offset difference between said offsets of said at least two of said plurality of fingers.

9. The receiver of claim 8 wherein said receiver is configured to adjust a first offset of a first receiver finger receiving a relatively weak component to differ from a second offset of a second receiver finger receiving a stronger component by at least said offset difference when said offset difference between said first and second offsets has been violated.

10. The receiver of claim 8 wherein said receiver uses PN code offsets as said offsets.

11. The receiver of claim 8 wherein said receiver being a CDMA RAKE receiver.

12. A receiver comprising:
   a plurality of receiver fingers which are initially assigned delays, called offsets, corresponding to multipath components of a signal from an antenna; and
   said receiver configured to establish at least an offset difference and to adjust a first offset of a first receiver finger receiving a relatively weak component to differ from a second offset of a second receiver finger receiving a stronger component by said offset difference when said offset difference between said first and second offsets has been violated.

13. The receiver of claim 12 wherein said receiver uses PN code offsets as said offsets.

14. The receiver of claim 12 wherein said receiver being a CDMA RAKE receiver.

* * * * *